(12) United States Patent
Wakumoto et al.

(10) Patent No.: US 7,969,863 B2
(45) Date of Patent: Jun. 28, 2011

(54) DIRECTED COST PROTOCOL

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1477 days.

(21) Appl. No.: 10/812,260

(22) Filed: Mar. 29, 2004

(65) Prior Publication Data

US 2005/0213510 A1 Sep. 29, 2005

(51) Int. Cl.
*G01R 31/08* (2006.01)
*G06F 11/00* (2006.01)
*H04L 12/28* (2006.01)

(52) U.S. Cl. .................. 370/216; 370/252; 370/254

(58) Field of Classification Search .................. None
See application file for complete search history.

(56) References Cited

U.S. PATENT DOCUMENTS

| | | | |
|---|---|---|---|
| 5,317,566 A * | 5/1994 | Joshi | 370/238 |
| 5,459,713 A * | 10/1995 | Curtis | 370/255 |
| 6,301,244 B1 * | 10/2001 | Huang et al. | 370/351 |
| 6,310,883 B1 * | 10/2001 | Mann et al. | 370/408 |
| 6,377,551 B1 * | 4/2002 | Luo et al. | 370/238 |
| 6,493,318 B1 | 12/2002 | Bare | |
| 6,577,600 B1 | 6/2003 | Bare | |
| 6,580,715 B1 | 6/2003 | Bare | |
| 6,633,544 B1 * | 10/2003 | Rexford et al. | 370/238 |
| 6,873,616 B1 * | 3/2005 | Fedyk et al. | 370/357 |
| 6,928,483 B1 * | 8/2005 | Cain | 709/238 |
| 6,970,417 B1 * | 11/2005 | Doverspike et al. | 370/216 |
| 6,999,423 B2 * | 2/2006 | Call et al. | 370/238 |
| 7,099,341 B2 * | 8/2006 | Lingafelt et al. | 370/401 |
| 7,286,489 B2 * | 10/2007 | Ades | 370/254 |
| 7,382,738 B2 * | 6/2008 | Ravindran et al. | 370/254 |
| 7,395,351 B1 * | 7/2008 | Nucci et al. | 709/242 |
| 7,400,589 B2 * | 7/2008 | Zhang et al. | 370/254 |
| 7,433,315 B2 * | 10/2008 | Bhatia et al. | 370/237 |
| 7,633,873 B1 * | 12/2009 | Kohler et al. | 370/238 |
| 2003/0067941 A1 * | 4/2003 | Fall | 370/468 |
| 2003/0142685 A1 * | 7/2003 | Bare | 370/410 |
| 2003/0193898 A1 * | 10/2003 | Wong et al. | 370/252 |
| 2004/0190445 A1 * | 9/2004 | Dziong et al. | 370/225 |
| 2005/0068941 A1 * | 3/2005 | Erhart | 370/352 |
| 2005/0078610 A1 * | 4/2005 | Previdi et al. | 370/254 |
| 2005/0078656 A1 * | 4/2005 | Bryant et al. | 370/351 |
| 2005/0111375 A1 * | 5/2005 | Ravindran et al. | 370/252 |
| 2005/0249215 A1 * | 11/2005 | Kelsey et al. | 370/392 |
| 2008/0159174 A1 * | 7/2008 | Enomoto et al. | 370/256 |

* cited by examiner

*Primary Examiner* — Warner Wong (57) ABSTRACT

One embodiment disclosed relates to a method of cost determination for paths between switches in a mesh. A set of paths between each pair of the mesh switches is defined, and start-up costs for the paths are calculated. The costs for the previously defined paths are subsequently recalculated using a directed cost protocol. The directed cost protocol may include generating at a first switch a cost packet with path information associated with a specific path, and unlasting the cost packet via the specific path to a second switch.

21 Claims, 8 Drawing Sheets

DIRECTED COST PROTOCOL

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Having multiple paths between two devices enhances reliability of network communication between the devices by allowing for a redundant (backup) network path to be used between two devices when a primary path fails.

SUMMARY

One embodiment of the inventiori relates to a method of cost determination for paths between switches in a mesh. A set of paths between each pair of the mesh switches is defined, and start-up costs for the paths are calculated. The costs for the previously defined paths are subsequently recalculated using a directed cost protocol. The directed cost protocol may include generating at a first switch a cost packet with path information associated with a specific path, and unlasting the cost packet via the specific path to a second switch.

Another embodiment of the invention relates to a switching mesh comprising multiple packet switches. The switching mesh includes means for defining a set of paths between each pair of the mesh switches, means for calculating start-up costs for the paths, and means for recalculating costs for the previously defined paths using a directed cost protocol.

Another embodiment of the invention relates to a packet switch apparatus in a switching mesh. The apparatus includes a plurality of ports and a switch control device coupled to the plurality of ports. The switch control device is configured to execute directed cost protocol instructions in order to recalculate costs for previously defined paths.

DETAILED DESCRIPTION

A. Switching Mesh and Path Tagging

Figure 1:
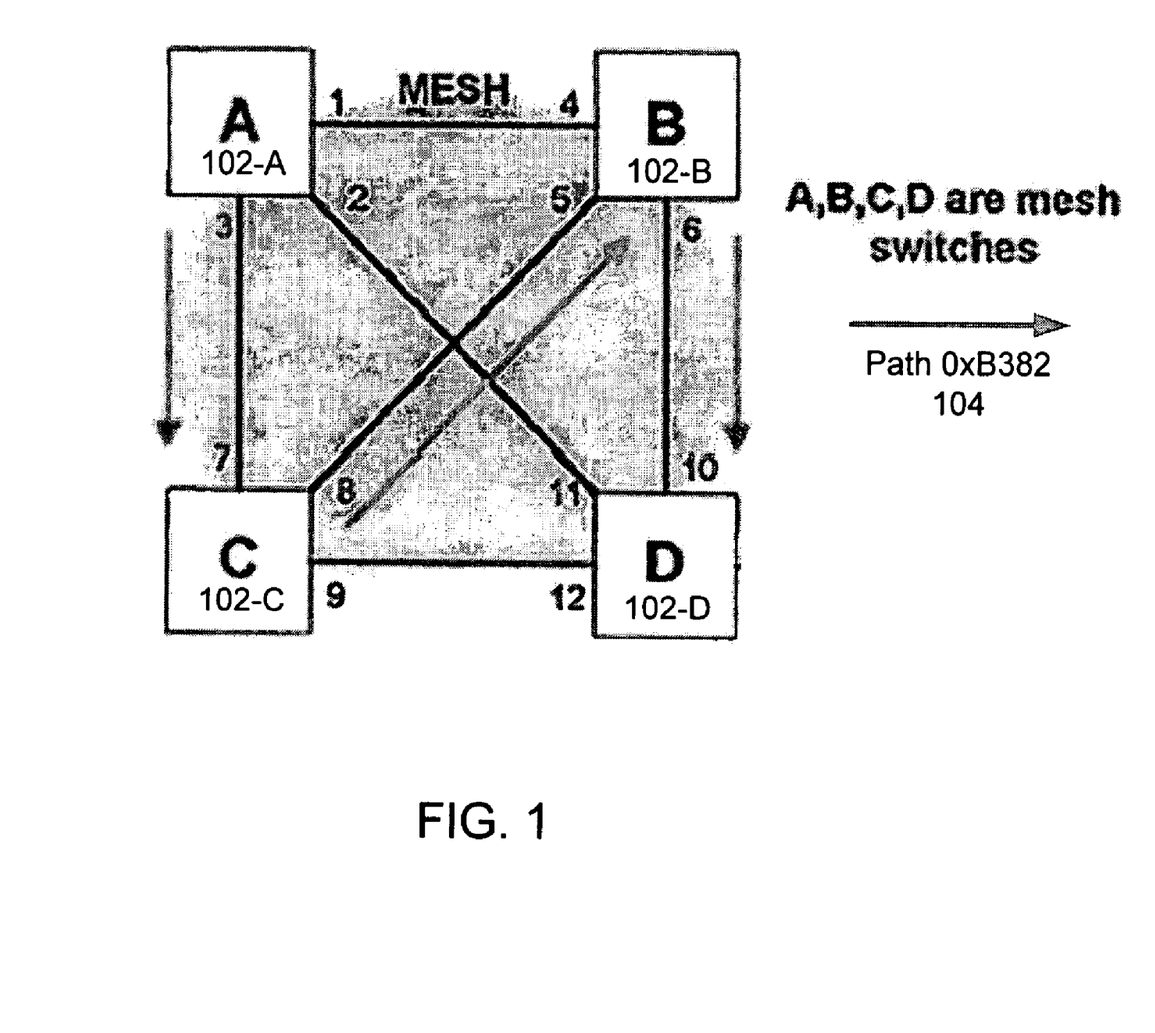
FIG. 1 is a schematic diagram depicting an exemplary switching mesh in accordance with an embodiment of the invention.

FIG. 1 is a schematic diagram depicting a switching mesh in accordance with an embodiment of the invention. One example path 104 is shown in FIG. 1. This path 104, designated in this instance as path 0×B382, travels as follows: exits port 3 of switch A 102-A; enters port 7 of switch C 102-C; exits port 8 of switch C 102-C; enters port 5 of switch B 102-B; exits port 6 of switch B 102-B; and enters port 10 of switch D 102-D.

In accordance with an embodiment of the invention, mesh tagging is utilized to advantageously identify paths within the mesh from a source switch to a destination switch. In one implementation, each source/destination pair may be configured with up to fifteen different paths. This is because four bits are used for the path identifier in a path tag and the zero value is considered invalid in this specific implementation. One example of such a path tag is described further below in relation to FIG. 2. Other embodiments may provide a different number of broadcast paths per switch by using a different number of bits for the path identifier. For example, if the path identifier has six bits, then each source/destination pair may be configured with sixty-three different paths.

Figure 2:
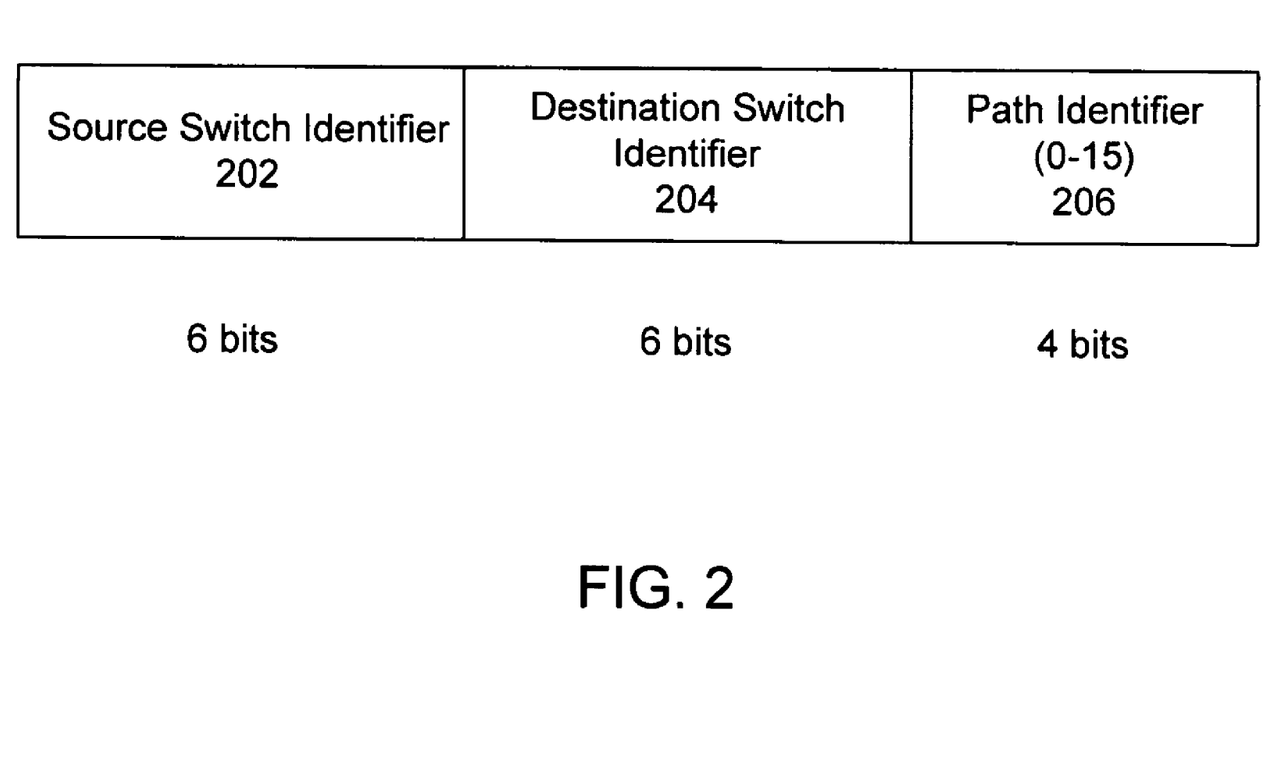
FIG. 2 is a diagram of a path tag in accordance with an embodiment of the invention.

FIG. 2 is a diagram of a path tag in accordance with an embodiment of the invention. The path tag includes a source switch identifier 202, a destination switch identifier 204, and a path identifier 206. In this embodiment, the path tag is sixteen bits in length. In particular, the source switch identifier 202 is six bits long, the destination switch identifier 204 is six bits long, and the path identifier 206 is four bits long. In this implementation, with the switch identifiers being six bits long, sixty-three different switches in the mesh may be distinguished and identified. (The value zero for the switch id being considered an invalid value in this implementation.) With the path identifier being four bits long, fifteen different paths may be identified per source/destination pair. (The value zero for the path id again being considered invalid in this implementation.) Other embodiments may have other lengths for these fields, resulting in different numbers of identifiable switches and paths.

Consider, for example, the mesh depicted in FIG. 1. Path tags of the format depicted in FIG. 2 may be used to identify different paths, for instance, from switch A to switch D. Given that source and destination, each path tag would include an identifier corresponding to switch A in the source switch identifier field 202 and an identifier corresponding to switch D in the destination switch identifier field 204. Distinctive path identifiers, one per path between A and D, would be included in the path identifier field 206.

For instance, a first path may go directly from A to D by exiting port 2 of switch A and entering port 11 of switch D. A second path (not shown) may travel from A to D via switch C by exiting port 3 on switch A, entering port 7 of switch C, exiting port 9 of switch C, and entering port 12 of switch D. And so on for other possible paths. Each path is associated with a unique path identifier.

Consider the case where switch D learns a new MAC address and informs the rest of the mesh of the new MAC address associated with switch D. Switch A can then assign to that MAC address a path tag corresponding to one of the aforementioned paths from A to D (for example, path tag 0×B382 discussed above). Subsequently, every packet destined for that MAC address that enters switch A may be forwarded through the mesh based on that assigned path tag.

B. Example Packet Switch

Figure 3:
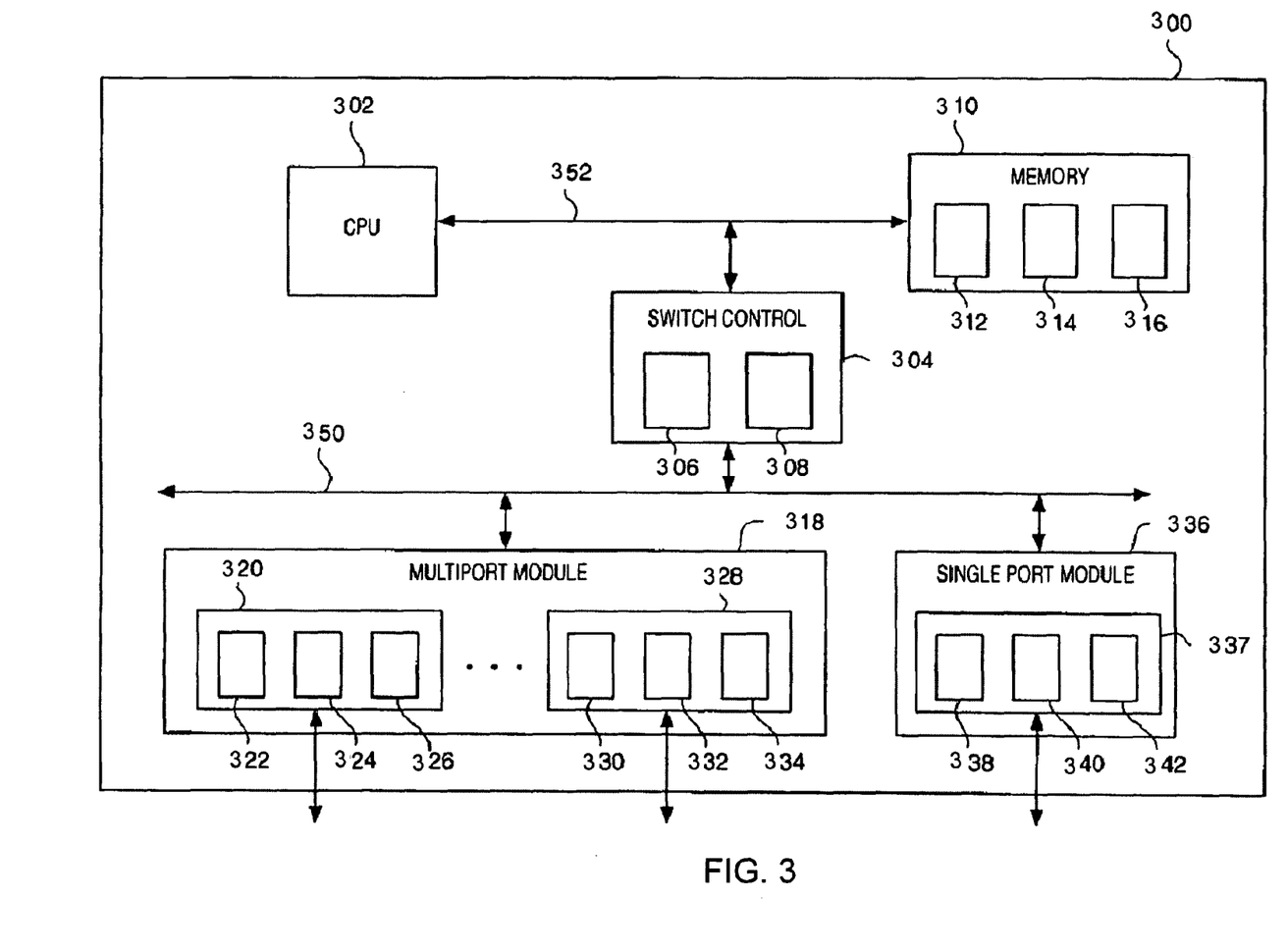
FIG. 3 is a schematic diagram of an example packet switch operable in accordance with an embodiment of the invention.

FIG. 3 is a schematic diagram of an example packet switch 300 operable in accordance with an embodiment of the invention. The specific configuration of packet switches used will vary depending on the specific implementation.

A central processing unit (CPU) 302 performs overall configuration and control of the switch 300 operation. The CPU 302 operates in cooperation with switch control 304, an application specific integrated circuit (ASIC) designed to assist CPU 302 in performing packet switching at high speeds required by modern networks.

The switch control 304 controls the "forwarding" of received packets to appropriate locations within the switch for further processing and/or for transmission out another switch port. Inbound and outbound high speed FIFOs (306 and 308, respectively) are included with the switch control 304 for exchanging data over switch bus 352 with port modules. In accordance with an embodiment of the invention, the switch control ASIC 304 is configured to insert, remove, and analyze a path tag within a fixed location in a packet.

Memory 310 includes a high and low priority inbound queue (312 and 314, respectively) and outbound queue 316. High priority inbound queue 312 is used to hold received switch control packets awaiting processing by CPU 302 while low priority inbound queue 314 holds other packets awaiting processing by CPU 302. Outbound queue 316 holds packets awaiting transmission to switch bus 350 via switch control 304 through its outbound FIFO 308. CPU 302, switch control 304 and memory 310 exchange information over processor bus 352 largely independent of activity on switch bus 350.

The ports of the switch may be embodied as plug-in modules that connect to switch bus 350. Each such module may be, for example, a multi-port module 318 having a plurality of ports in a single module or may be a single port module 336. A multi-port module provides an aggregate packet switch performance capable of handling a number of slower individual ports. For example, in one embodiment, both the single port module 336 and the multi-port module 318 may be configured to provide, for example, approximately 1 Gbit per second packet switching performance. The single port module 336 therefore can process packet switching on a single port at speeds up to 1 Gbit per second. The multi-port module 318 provides similar aggregate performance but distributes the bandwidth over, preferably, eight ports each operating at speeds, for example, of up to 100 Mbit per second.

Each port includes high speed FIFOs for exchanging data over its respective port. Specifically, each port, 320, 328, and 337, preferably includes an inbound FIFO 322, 330, and 338, respectively for receiving packets from the network medium connected to the port. Further, each port 320, 328, and 337, preferably includes a high priority outbound FIFO 324, 332, and 340, respectively, and a low priority outbound FIFO 326, 334, and 342, respectively. The low priority outbound FIFOs are used to queue data associated with transmission of normal packets while the high priority outbound FIFO is used to queue data associated with transmission of control packets. Each module (318 and 336) includes circuits (not specifically shown) to connect its port FIFOs to the switch bus 350.

As packets are received from a port, the packet data is applied to the switch bus 350 in such a manner as to permit monitoring of the packet data by switch control 304. In general, switch control 304 manages access to switch bus 350 by all port modules (i.e., 318 and 336). All port modules "listen" to packets as they are received and applied by a receiving port module to switch bus 350. If the packet is to be forwarded to another port, switch control 304 applies a trailer message to switch bus 350 following the end of the packet to identify which port should accept the received packet for forwarding to its associated network link.

C. Topology Protocols

1. Topology Inform Protocol

Figure 4A:
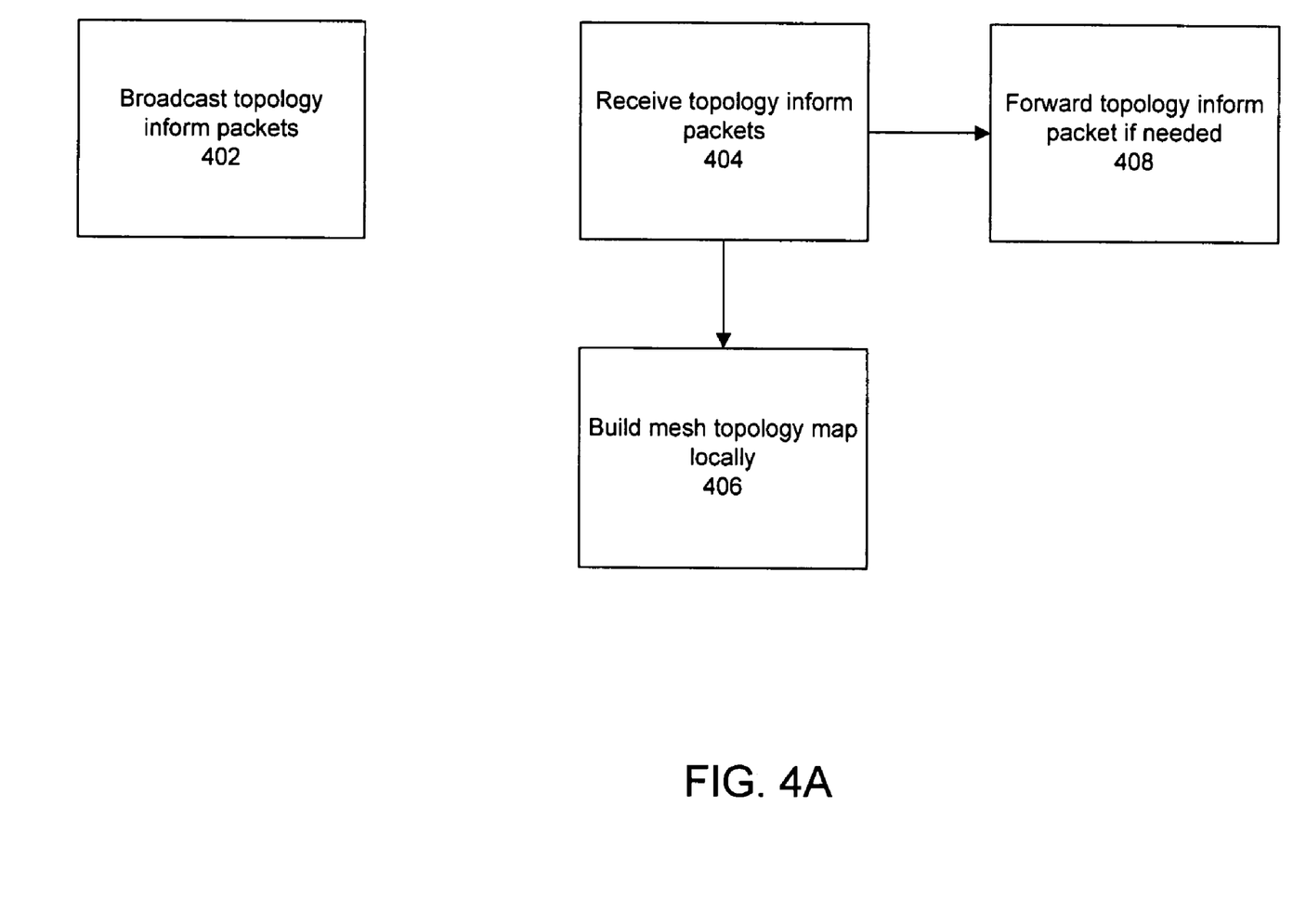
FIG. 4A is a block diagram depicting a method of building local mesh topology maps in accordance with an embodiment of the invention.

FIG. 4A is a block diagram depicting a method of building local mesh topology maps in accordance with an embodiment of the invention. The depicted method uses a mesh topology inform protocol.

Preliminarily, a switch identifier (ID) negotiation protocol may be used to enable all switches in the mesh to have a unique ID within the mesh. In one specific implementation, the switch ID may be a 64-bit value stored in an eight byte (64 bit) marked bits field. In one aspect of the switch ID negotiation protocol, new switches that enter the mesh cannot use a switch ID which is currently being used by a switch that is already in the switch ID negotiation completed state. Alternatively, the switch IDs may be chosen by user configuration.

Once a switch has negotiated a switch ID, the switch may broadcast 402 topology inform packets to other switches belonging to the mesh. In one example, the topology inform packet may include the following information: switch ID; number of mesh links; local port number per mesh link; neighbor switch per mesh link; and neighbor switch port number per mesh link. For example, in the mesh depicted in FIG. 1, switch D may inform the rest of the mesh of: its switch ID; that it has three mesh ports numbered 10, 11, and 12; and that these ports are connected to port 6 of switch B, port 2 of switch A, and port 9 of switch C, respectively. In one embodiment, the topology inform packets may be broadcast out of all established port periodically or intermittently, such as once per minute or some other period.

The topology inform packets are received 404 by a mesh switch from other mesh switches. From the information in the topology inform packets received, a mesh topology map may be built 406 locally at each mesh switch.

The receiving mesh switch may also forward 408 the topology inform packets to neighboring mesh switches, if such forwarding is determined to be needed. In one embodiment, the forwarding mechanism may operate by using a multiple-bit field in the topology inform packet where each bit corresponds to a switch ID. If a switch has already seen this packet, then the bit may be set (otherwise, the bit should be cleared). If the bit corresponding to the neighbor mesh switch is already set, then the switch knows not to forward the packet to that neighbor. In another embodiment, a multiple-bit sequence number may be used in the topology inform packet. Switches that receive a topology inform packet would then check the sequence number to determine if it has already seen this packet. Only if the switch has not seen this packet before, will it update its information and forward the packet out of all mesh ports (other than the port connected to the source switch).

2. Topology Update Protocol

In accordance with an embodiment of the invention, a link state may be determined with a handshake mechanism between both switches. The handshake may be performed periodically (for example, every three to five minutes). The handshake may comprise a two-way handshake which utilizes request and acknowledgement messages. Alternatively, a three-way handshake may be used to indicate both switches are established. The three-way handshake may comprise the following communication sequence: 1) first switch sends a link state request message (REQ packet) to second switch on link between them; 2) second switch receives the request message and returns a first link state acknowledgement message (ACK packet) to the first switch on the same link; and 3)

first switch receives the acknowledgement message and returns a second link state acknowledgment message (REQ ACK or ACK2 packet).

Figure 4B:
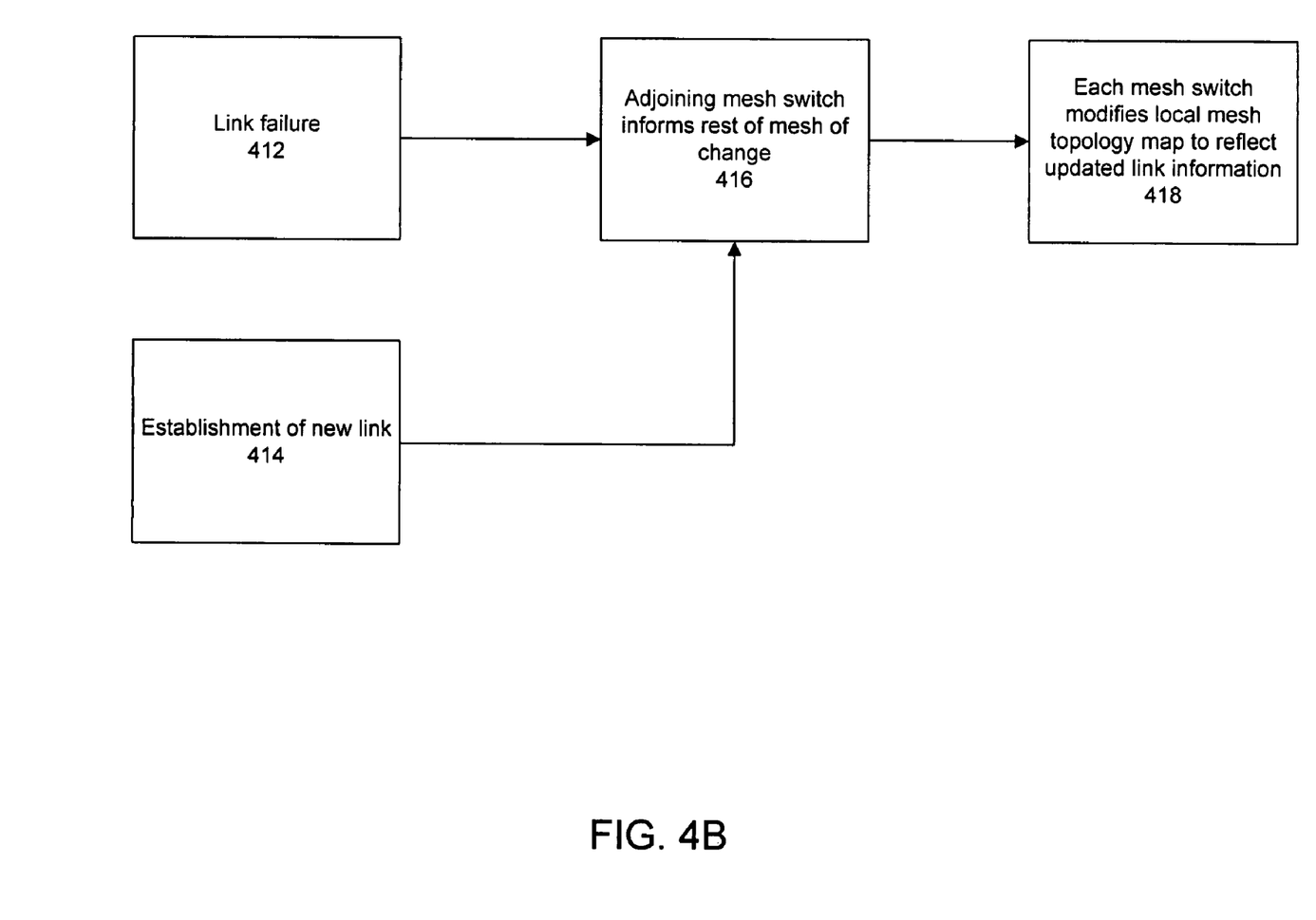
FIG. 4B is a block diagram depicting a method of maintaining local mesh topology maps in accordance with an embodiment of the invention.

FIG. 4B is a block diagram depicting a method of maintaining local mesh topology maps in accordance with an embodiment of the invention. Upon a link failure 412 or establishment 414 of a new mesh link, a mesh switch adjoining to the failed or new link will inform 416 the rest of the mesh of this change in the topology. This may be performed by using a topology update protocol. Like the topology inform protocol, the topology update protocol packets may be flooded to all mesh ports or sent along a broadcast path. To speed up processing, the topology update protocol packets may contain only information of only the links that have been entered or exited the established state of the topology. Using the received information, each mesh switch will modify 418 its mesh topology map to reflect the updated link information.

D. Prior Cost Protocol

Figure 5:
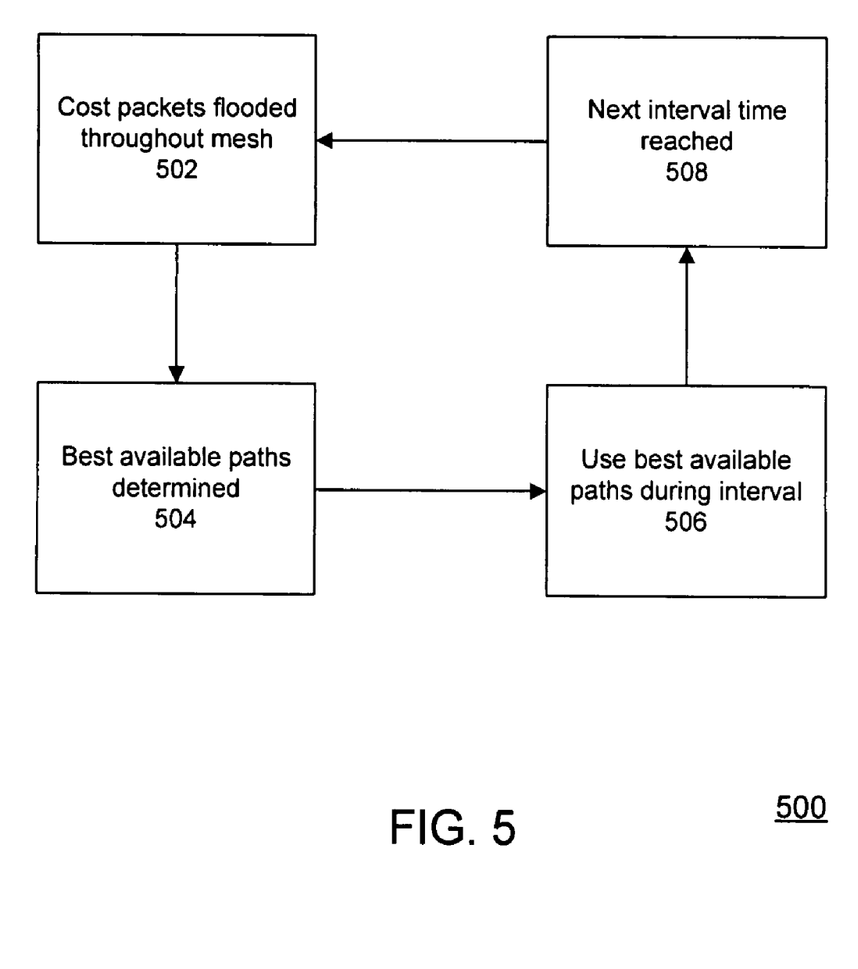
FIG. 5 is a flow chart depicting a prior cost protocol procedure.

A prior cost protocol 500 for a switching mesh is now discussed in relation to the flow chart of FIG. 5. This prior cost protocol 500 operates by flooding 502 cost packets in order to determine 504 the best available path to the sending switch. Cost packets are not flooded if they have a greater (i.e. worse) cost than previously received cost packet from the same switch using the same sequence number. For the flooding, each mesh switch would broadcast its cost packets out all of its mesh ports. The cost packets are received by neighbor switches which then update their path data towards that sending switch, add the inbound queue cost for the port that the packet was received on, duplicate the cost packet, and forward the duplicated cost packet out all other mesh ports. Similarly for the next neighbor switches, and so on. Using these cost packets, the costs of every path from a sending switch to a destination switch are determined. From this cost data, the best available path from the sending switch to the destination switch is determined 504.

During each interval, the most recently determined best available paths are utilized 506 to transmit packets between switches in the mesh. In the prior cost protocol 500, the steps 502 and 504 to determine the best available paths are repeated at regular intervals 508, for example, every 30 seconds. These steps are repeated regularly because traffic loads change over time and so the best available paths also change over time.

When one mesh switch is informed of a new MAC address being learned on another mesh switch (the owning switch), the former mesh switch would assign the best available path to the latter switch (the owning switch). This assigned path would be chosen for all MAC addresses assigned to the owning switch. The assignments remain static over any interval, though they may change between intervals based upon the re-determined best available paths. Hence, at any given time, there is only one path used for assigning unicast traffic from one mesh switch to another mesh switch for a given cost convergence.

This prior cost protocol 500 is a very "chatty" protocol that spans all mesh links. The cost packets are the mechanism by which each mesh switch determines the best available path to each of the other mesh switches. Every mesh switch broadcasts a flurry of these cost packets, and this is repeated at regular intervals.

There are some disadvantages to this prior cost protocol 500. Due to the repeated flooding 502 of cost protocol packets, this protocol 500 utilizes a large amount of system resources, such as packet buffers. Another disadvantage of the old cost protocol is that the large amounts of cost packets generated will use up more bandwidth on the network. A packet buffer is a piece of memory that is used by the CPU to send packets out of the switch. Since resources are limited in the embedded operating system of the switch, packet buffers should be used efficiently. In a large mesh environment, a core mesh switch may utilize over a thousand packet buffers just for the cost protocol. This is because, in addition to broadcasting the core switch's own cost protocol packets, the core switch also has to re-broadcast each other switch's cost protocol packets. This large consumption of system resources is undesirable.

E. Directed Cost Protocol

In accordance with an embodiment of the invention, by using mesh tagging (i.e. tags identifying different paths through the mesh), each switch may maintain a set of multiple paths to each of the other switches in the mesh. For example, in one implementation, each mesh switch may maintain a set of up to 16 identified paths to each of the other mesh switches.

Figure 6:
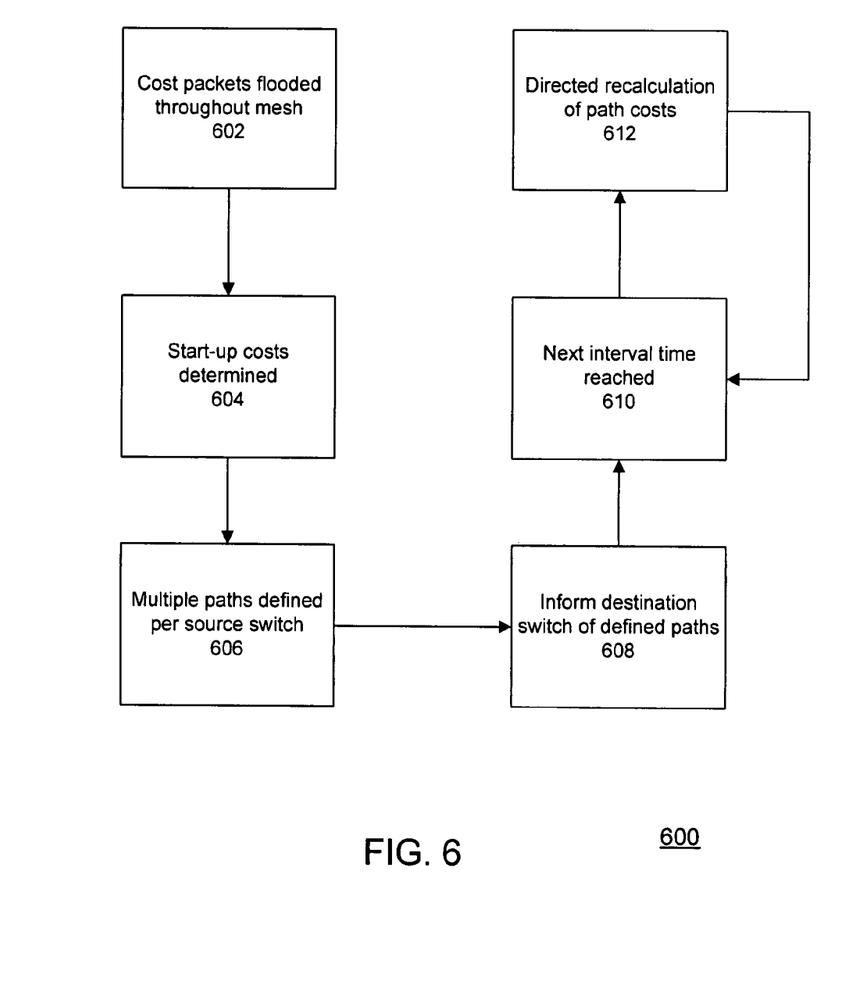
FIG. 6 is a flow chart depicting a directed cost protocol procedure in accordance with an embodiment of the invention.

FIG. 6 is a flow chart depicting a directed cost protocol procedure in accordance with an embodiment of the invention. As a switch configured with mesh tagging capability enters the mesh, the switch will flood 602 cost packets (which are processed, including the addition of cost information, and forwarded by neighboring packets, and so on) in order to determine 604 the costs of the paths through the mesh at this start-up time. Unlike the packet flooding 502 and best available path determination 504 in the prior cost protocol 500, these flooding 602 and start-up cost determination 604 steps are not repeated at regular time intervals in the directed cost protocol 600. Instead, these steps 602 and 604 are performed once as the switch enters the mesh. Note that the flood discovery of all paths may be done at much longer intervals to detect if path cost of non-tagged paths have changed substantially so that they may be added as a new tagged path and less desirable paths are removed. This would require the usage of, for example, only 13 to 14 of the 16 path tags and keeping 2 to 3 path tags reserved for this case. When a new, better path is found, the switch could then inform others of this new path, pick a less desirable path, and move all of its traffic onto the new path. This would then render the old path unused and once it is safely assumed that no packets with that tag is in the mesh, that unused path may be removed (and other switches informed to remove it). A sufficient time needed to ensure that all packets with a given tag are no longer within the mesh may be, for example, half a minute or a minute.

After the start-up cost determination 604, each source mesh switch defines 606 a set of multiple unique paths to each destination mesh switch. When the source switch receives a packet destined for the destination switch, the source switch uses one of these pre-defined paths by inserting the associated path tag and sending the packet out the associated port. Each source switch also informs 608 each destination switch of these defined paths (and their associated path tags).

In accordance with one embodiment of the direct cost protocol, at periodic intervals 610, the costs of these paths are efficiently recalculated 612 without re-doing the initial flooding 602 of cost packets. While the initial flooding 602 is essentially "undirected" or without direction, the recalculation 612 is "directed" in that it is specifically targeted to only the pre-defined paths.

Figure 7:
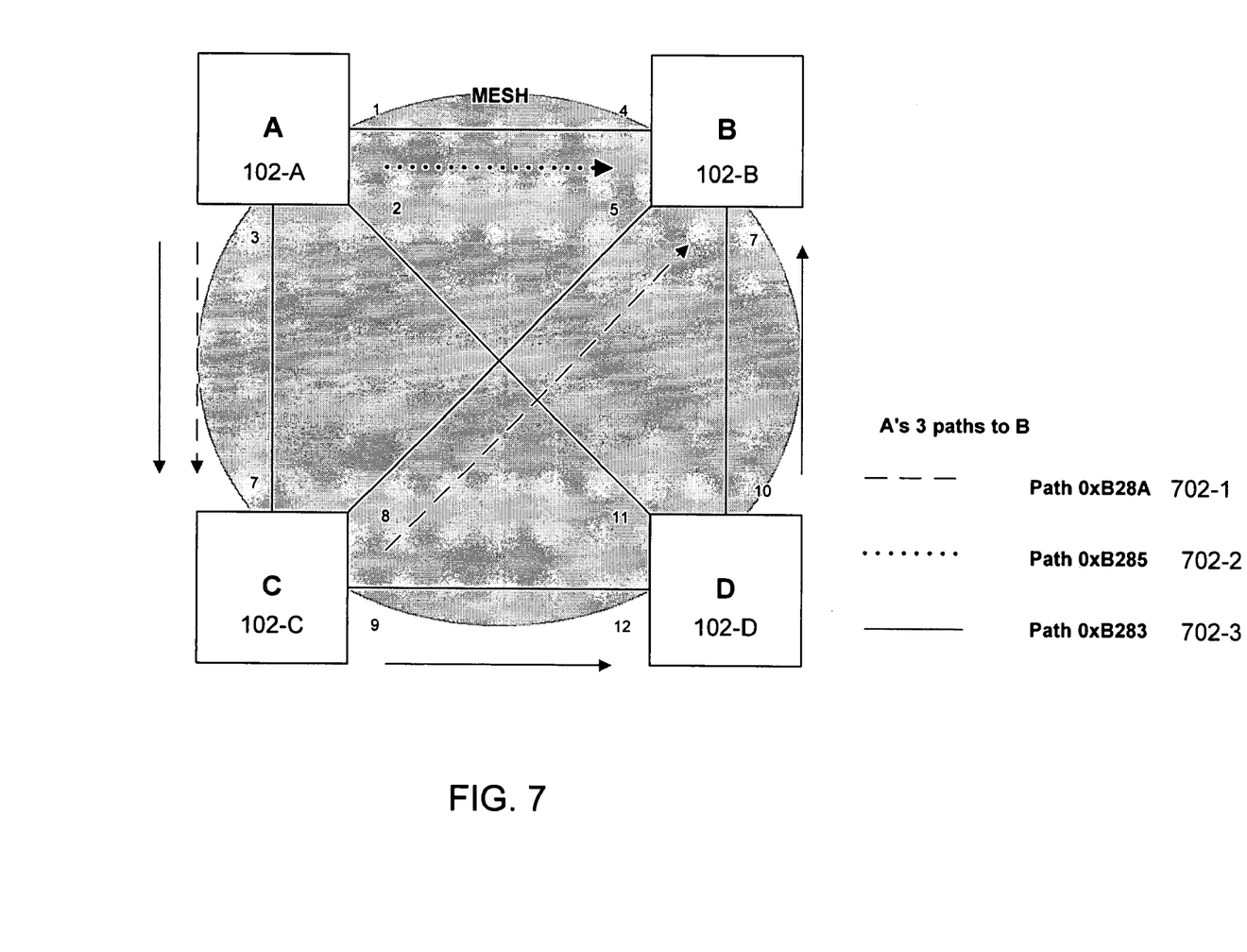
FIG. 7 is a schematic diagram depicting an exemplary switching mesh and a set of multiple paths therein for discussing the directed cost protocol.

An example of the procedure for recalculation 612 is now discussed in relation to FIG. 7. FIG. 7 depicts an example mesh and shows three defined (and unique) paths (702-1, 702-2, and 702-3) in the mesh from switch A 102-A to switch B 102-B.

Once switch A 102-A defines 606 its three paths (702-1, 702-2, and 702-3) to switch B 102-B, switch A 102-A will inform 608 switch B 102-B of these paths. Subsequently, when the time comes (for example, at the end of a periodic interval of time) to recalculate 612 the costs of the paths, switch B 102-B will then transmit in a targeted manner a directed cost packet down each of the paths previously defined by switch A 102-A. (Likewise, switches C and D will define their paths to switch B and inform switch B of these paths. Switch B will also send directed cost packets down these pre-defined paths to switches C and D. And so on for the other switches, instead of switch B, as a destination switch.) Because the cost packets are transmitted in a directed or unicast manner (instead of an undirected or broadcast manner), switch B sends less cost packets through the mesh. (Similarly for the other switches as destination switches.) Hence, the total amount of resources used by the cost protocol is reduced, and the amount of administrative traffic on the network is lessened.

Consider an example directed cost packet that traverses along a given path from switch B to switch A. For instance, tag 0×B283 702-3 is defined as the path going from switch A (exiting at port 3), to switch C (exiting at port 9), to switch D (exiting at port 10), and finally to switch B. When switch B sends the directed packet to switch A, it traverses along the same path in the reverse direction. In the instant example, the directed packet travels from switch B (exiting at port 6), to switch D (exiting at port 12), to switch C (exiting at port 7), and finally to switch A. In one embodiment, this reverse path information is self-contained within the directed cost packet, so that intermediate switches (switches D and C in the above example) have the information necessary to forward the directed cost packets. Otherwise, the intermediate switches would need to store state path information locally at each switch.

The directed cost protocol works well because the multiple pre-defined paths per pair of switches do not need frequent updating for the protocol to be effective. In contrast, the prior cost protocol uses only a single (best available) path per pair of switches within a given interval.

In addition, a piggyback feature may be provided for the direct cost packets. In other words, directed cost packets may effectively piggyback upon one another. For example, paths 0×B285 702-2 and 0×B283 702-3 both traverse the link between switches D and B in FIG. 7. Since the cost information is the same (for either path) across that same link, switch B may be configured to send a single directed cost packet (instead of two packets) to switch D. This single cost packet would include the necessary information for both paths 0×B285 702-2 and 0×B283 702-3. After receiving the single directed cost packet for the two paths, the switch control in switch D splits the single packet into two directed cost packets, one for each path. Although the above example discusses piggybacking where the information for two paths are integrated into a single directed cost packet, the information for three, four, or more paths may be integrated into a directed cost packet. In other words, the piggybacking technique may be applied to any number of paths crossing a same link. Advantageously, using such piggybacking further lessens the administrative traffic due to the cost protocol.

In addition to the above-described features of the directed cost protocol, an accelerated mechanism may be provided for updating the costs when an event occurs that quickly increases the cost of a given link. For example, costs may quickly increase when a port is oversubscribed such that packets get dropped in the outbound queue. In cases such as this, the tag cost may be immediately updated rather than waiting for a periodic directed cost packet to be sent by the switch at the termination point of a tag.

The more immediate updating may be accomplished as follows. When a switch detects an oversubscription condition at one of its mesh ports, the detecting switch may send a "directed cost update" message to other switches in the mesh that initiate tags containing the oversubscribed port. (In addition, a separate message may be sent by the detecting switch to the initiating edge switch regarding the severity of the oversubscription, so that the initiating switch may perhaps change paths by retagging.) The directed cost update message may contain the delta cost (i.e. the change in cost) for the tag. The delta cost may be calculated from the difference between the current cost added by the switch and the previous cost added by the switch. When a switch receives this delta cost relating to a tag that it initiates, the receiving switch adds the delta cost to the current cost for the tag in order to update it. In this manner, a port that is oversubscribed becomes known as more costly in an advantageously immediate fashion rather than having to wait for a periodic recalculation of such costs. The more immediate updating of the tag costs allows for more appropriate load balancing to be performed. (Note that, in one implementation, the cost may be a function of link speed, outbound queue depth, inbound queue depth, and number of dropped packets. Since measurements of these factors may be performed at polled intervals, the calculated cost will typically be smoothed using an algorithm that gives more weight to the current measurement.)

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of cost determination for paths between switches in a mesh, the method comprising:
   defining a set of paths between each pair of the mesh switches, each pair comprising a source switch and a destination switch;
   calculating start-up costs for the previously defined paths; and
   recalculating costs for the previously defined paths using a directed cost protocol by transmitting a directed cost packet only down each of the previously defined paths from the destination switch to the source switch for each pair.

2. The method of claim 1 wherein the directed cost protocol comprises generating at the destination switch a cost packet with path information associated with a specific path.

3. The method of claim 2 wherein the directed cost protocol further comprises unicasting the cost packet via the specific path to the source switch.

4. The method of claim 3 wherein intermediate switches along the specific path each add cost information to the cost packet prior to forwarding the cost packet to a next switch along the specific path.

5. The method of claim 4 further comprising repeating the recalculation at periodic intervals.

6. The method of claim 5 wherein the directed cost protocol further comprises piggybacking information for more than one path into the cost packet.

7. The method of claim 1 wherein the previously defined paths are identified by path tags inserted into packets sent between the mesh switches.

8. The method of claim 1, wherein start-up cost packets are flooded through the mesh in order to define the set of paths between each pair of mesh switches and calculate the start-up costs.

9. A switching mesh comprising multiple packet switches, the switching mesh including
   means for defining a set of paths between each pair of the mesh switches, each pair comprising a first switch and a second switch;
   means for calculating start-up costs for the defined paths; and
   means for recalculating costs for the previously defined paths using a directed cost protocol by transmitting a directed cost packet only down each of the previously defined paths from the second switch to the first switch for each pair.

10. The switching mesh of claim 9 wherein the previously defined paths are identified by path tags inserted into packets sent between the mesh switches, and wherein start-up cost packets are flooded through the mesh in order to define the set of paths between each pair of mesh switches and calculate the start-up costs.

11. The switching mesh of claim 10 further comprising means for repeating the recalculation at periodic intervals.

12. The switching mesh of claim 11, wherein the directed cost protocol comprises generating at the second switch a cost packet with path information associated with a specific path that begins at the first switch and ends at the second switch and unicast transmission of the cost packet via the specific path to the first switch.

13. The switching mesh of claim 12 wherein intermediate switches along the specific path each add cost information to the cost packet prior to forwarding the cost packet to a next switch along the specific path.

14. The switching mesh of claim 13 wherein the directed cost protocol further comprises piggybacking information for more than one path into the cost packet.

15. A packet switch in a switching mesh, the packet switch comprising:
   a plurality of ports configured to connect to at least one destination switch in the switching mesh; and
   a switch control device coupled to the plurality of ports, wherein the switch control device is configured to define a set of paths from the packet switch to the destination switch, calculate start-up cost for the previously defined paths, and execute directed cost protocol instructions in order to recalculate costs for previously defined paths by receiving a cost packet transmitted from the destination switch only down each of the previously defined paths.

16. The packet switch of claim 15 wherein the directed cost protocol instructions are configured to generate the cost packet with path information associated with a specific path between the packet switch and the destination switch.

17. The packet switch of claim 16 wherein the directed cost protocol instructions are further configured to unicast the cost packet via the specific path to the packet switch.

18. The packet switch of claim 17 wherein the directed cost protocol instructions are further configured to repeat the recalculation of costs for previously defined paths at periodic time intervals.

19. The packet switch of claim 18 wherein the directed cost protocol instructions are further configured to piggyback information for more than one path into the cost packet.

20. The packet switch of claim 18 wherein the directed cost protocol instructions are further configured to perform a flood discovery of paths at longer periodic time intervals.

21. The packet switch of claim 20 wherein path costs determined by the flood discovery of paths are used to substitute more efficient paths for less efficient paths.

* * * * *

UNITED STATES PATENT AND TRADEMARK OFFICE
CERTIFICATE OF CORRECTION

| | | |
|---|---|---|
| PATENT NO. | : 7,969,863 B2 | |
| APPLICATION NO. | : 10/812260 | |
| DATED | : June 28, 2011 | |
| INVENTOR(S) | : Shaun Kazuo Wakumoto et al. | |

It is certified that error appears in the above-identified patent and that said Letters Patent is hereby corrected as shown below:

In column 12, line 16, in Claim 15, delete "paths ," and insert -- paths, --, therefor.

Signed and Sealed this
Third Day of January, 2012

David J. Kappos
*Director of the United States Patent and Trademark Office*